(12) United States Patent
Zuber

(10) Patent No.: US 12,529,393 B2
(45) Date of Patent: Jan. 20, 2026

(54) SELF-LOCKING RETAINING RING WITH A DIMPLE LOCKING MECHANISM

(71) Applicant: Smalley Steel Ring Company, Lake Zurich, IL (US)

(72) Inventor: Kenneth B. Zuber, Lake Zurich, IL (US)

(73) Assignee: Smalley Steel Ring Company, Lake Zurich, IL (US)

( * ) Notice: Subject to any disclaimer, the term of this patent is extended or adjusted under 35 U.S.C. 154(b) by 268 days.

(21) Appl. No.: 17/461,229

(22) Filed: Aug. 30, 2021

(65) Prior Publication Data
US 2022/0065280 A1    Mar. 3, 2022

Related U.S. Application Data

(60) Provisional application No. 63/073,619, filed on Sep. 2, 2020.

(51) Int. Cl.
*F16B 21/16*     (2006.01)
*F16B 21/18*     (2006.01)

(52) U.S. Cl.
CPC .......... *F16B 21/165* (2013.01); *F16B 21/183* (2013.01); *F16B 21/186* (2013.01)

(58) Field of Classification Search
CPC .... F16B 21/165; F16B 21/183; F16B 21/186; F16B 21/16; F16B 21/18; F16B 37/0878; F16B 37/0885; F16B 37/0892; F16B 43/005–007; F16B 1/02; F16J 9/16; F16J 9/24

USPC .......... 411/517, 521, 530; 277/446
See application file for complete search history.

(56) References Cited

U.S. PATENT DOCUMENTS

| | | | | |
|---|---|---|---|---|
| 242,346 A * | 5/1881 | Matthews | ................... | F16J 9/16 277/446 |
| 1,413,409 A * | 4/1922 | Lackman | ................... | F16J 9/16 277/489 |
| 1,597,525 A * | 8/1926 | Knake | ................... | F16B 43/006 411/540 |
| 1,750,356 A * | 3/1930 | Ragsdale | ................... | F16J 9/24 277/449 |
| 1,750,381 A * | 3/1930 | Baker | ................... | F16J 9/14 277/446 |
| 2,117,986 A * | 5/1938 | Robertson | ................ | F16J 9/063 277/485 |
| 2,303,722 A * | 12/1942 | Carlton | ................... | F16J 9/066 277/480 |
| 2,811,889 A * | 11/1957 | Wurzel | ................. | F16B 21/183 24/1 |
| 2,985,054 A * | 5/1961 | Bramberry | .............. | F16B 21/18 411/517 |
| 3,638,974 A * | 2/1972 | Stratienko | ............... | F16D 1/094 403/370 |
| 4,182,579 A * | 1/1980 | McCormick | ............ | F16B 21/18 411/517 |
| 4,552,427 A * | 11/1985 | Landgreen | ........... | H01R 13/622 439/316 |

(Continued)

*Primary Examiner* — Christine M Mills
*Assistant Examiner* — Dil K. Magar
(74) *Attorney, Agent, or Firm* — DLA PIPER LLP US

(57) ABSTRACT

A self-locking retaining ring can include a first turn of flat metal comprising a dimple; and a second turn of flat metal formed over the first turn. A slot is formed within the second turn and is adapted such that the dimple resides within the slot.

16 Claims, 13 Drawing Sheets

(56) References Cited

U.S. PATENT DOCUMENTS

| | | | | |
|---|---|---|---|---|
| 4,657,458 A | * | 4/1987 | Wollar | F16B 37/043 |
| | | | | 411/64 |
| 5,049,158 A | * | 9/1991 | Engelhardt | A61F 2/34 |
| | | | | 623/22.25 |
| 5,238,255 A | * | 8/1993 | Sytsma | F16J 9/067 |
| | | | | 277/479 |
| 5,660,485 A | * | 8/1997 | Podhajecki | F16C 19/26 |
| | | | | 384/572 |
| 6,309,157 B1 | * | 10/2001 | Amann | F16B 41/002 |
| | | | | 411/533 |
| 2002/0101039 A1 | * | 8/2002 | Bloemers | F16J 9/24 |
| | | | | 277/435 |
| 2006/0249913 A1 | * | 11/2006 | Nessa | F16J 9/16 |
| | | | | 277/493 |
| 2010/0314211 A1 | * | 12/2010 | Shirataki | F16D 41/067 |
| | | | | 192/45.016 |
| 2014/0169913 A1 | * | 6/2014 | Bochert | F16C 17/04 |
| | | | | 411/531 |
| 2015/0362106 A1 | * | 12/2015 | Laughlin | F16B 7/182 |
| | | | | 411/517 |
| 2016/0079702 A1 | * | 3/2016 | Laughlin | H01R 13/629 |
| | | | | 439/333 |
| 2017/0232526 A1 | * | 8/2017 | Cousineau | B23B 31/1071 |
| | | | | 279/46.7 |
| 2018/0252347 A1 | * | 9/2018 | Simon | F16L 37/0982 |

* cited by examiner

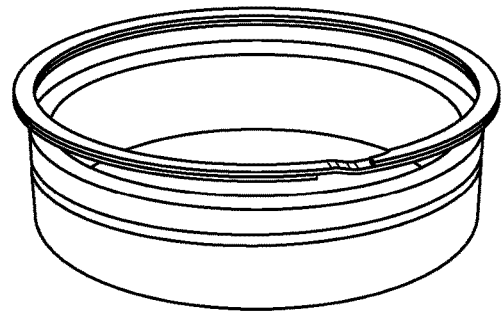
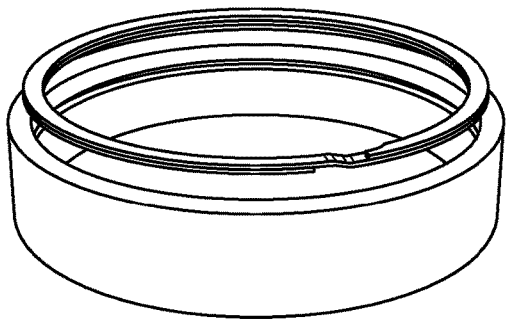
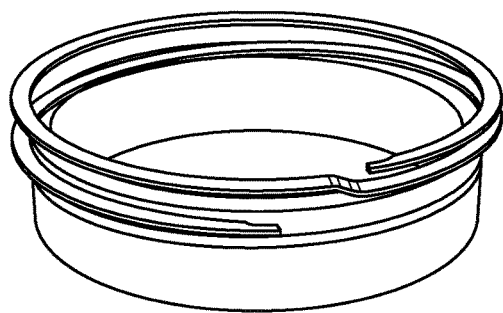
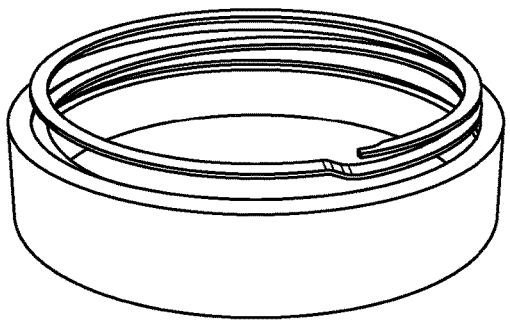
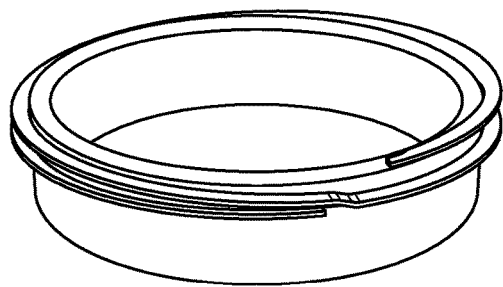
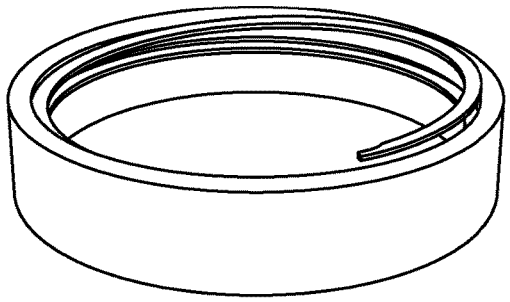
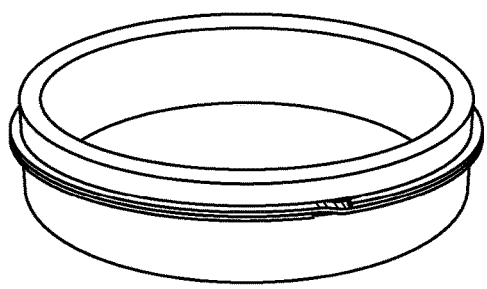
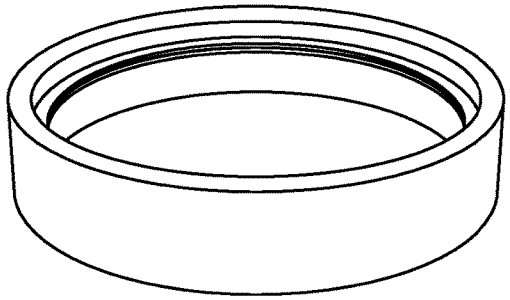
FIG. 17  FIG. 18

SELF-LOCKING RETAINING RING WITH A DIMPLE LOCKING MECHANISM

CROSS-REFERENCE TO RELATED APPLICATIONS

This application claims priority to U.S. Provisional Application No. 63/073,619, filed Sep. 2, 2020, which is herein incorporated by reference in its entirety.

FIELD OF THE INVENTION

The present technology generally relates to retaining rings that can be used either externally on a shaft or internally within a housing bore (also referred to as a bore).

BACKGROUND

Generally, retaining rings are fastening devices that fit on a shaft or in a bore to retain components in an axial position on the shaft or in the bore where they are situated. There are several types of retaining rings. Examples of retaining rings include, but are not limited to, circlips' that are stamped from sheet or strip metal, 'spiral' retaining rings that can be single or multiple turns and are formed from flat wire, and 'round wire' retaining rings formed from round wire. Retaining rings conventionally have an axial thickness that is smaller than their radial width. This means that the distance that such clips extend in a direction perpendicular to the shaft or bore for which they are installed, the radial width, is greater than the distance they extend along the shaft or bore, the axial thickness.

Conventional retaining rings are positioned in a groove that has been machined into the exterior surface of a shaft or the interior surface of a bore. The ring, as installed in its operating position in the groove, forms a shoulder that components ride up against, thereby, preventing the components from moving axially past the ring. Conventional retaining rings are designed to accommodate thrust loads in a purely axial direction.

BRIEF DESCRIPTION OF THE DRAWINGS

Various objectives, features, and advantages of the disclosed subject matter can be more fully appreciated with reference to the following detailed description of the disclosed subject matter when considered in connection with the following drawings, in which like reference numerals identify like elements.

FIG. 17 shows a manual installation process for an external ring.

FIG. 18 shows a manual installation process for an internal ring.

DETAILED DESCRIPTION

It is often desired that retaining rings are removable. Accordingly, components on a shaft that are held in position by a retaining ring may be removed from the shaft by first removing the retaining ring from the groove in the shaft and then sliding the components past the groove in which the retaining ring was positioned. The same is true for components in a bore being held in position by a retaining ring, except the ring is removed from a groove in the bore.

The design of a groove in which a retaining ring will be positioned is generally determined by the configuration of the retaining ring selected.

Figure 1:
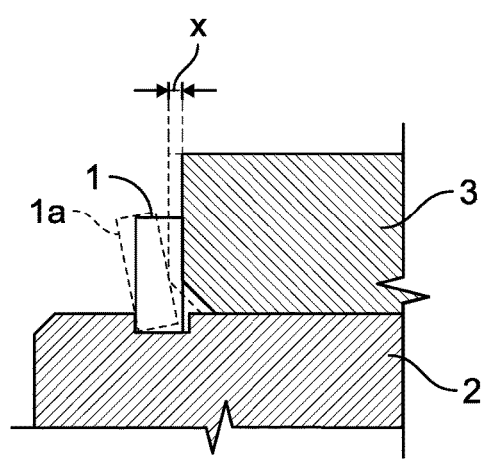
FIG. 1 shows ring twisting/dishing in the prior art.

In general applications, the thrust capacity of a retaining ring that is installed in its groove increases as the depth of the groove increases. The main reason is that grooves that are shallower can result in the ring twisting or dishing as load is applied. FIG. 1, for example, illustrates a typical retaining ring 1 in a groove on a shaft 2, with a thrust load being applied by a component 3. As the component 3 applies a thrust load to the retaining ring 1, the ring shifts to the position 1a, resulting in axial shift of the component 3 by an amount X. The groove continues to deform rapidly as load is further applied to the ring 1, increasing the dishing of the ring 1 that eventually contacts and mushrooms the groove wall causing failure as the ring 1 extrudes out.

Figure 2:
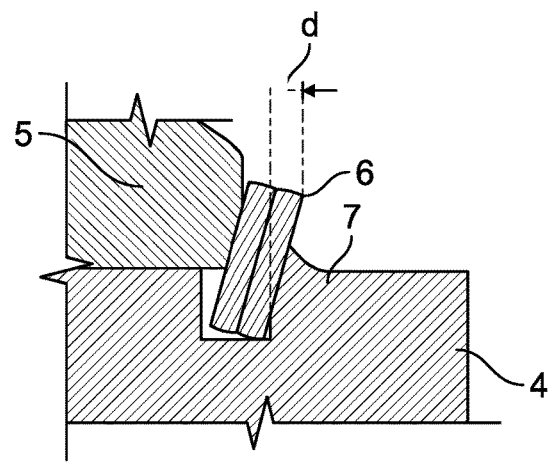
FIG. 2 shows deformation of a groove wall in the prior art.

Deformation of the groove wall is illustrated, for example, in FIG. 2. As shown, a component 5 is applying a thrust load to retaining ring 6, which is positioned in a groove in shaft 4. The retaining ring 6 is dishing by an amount D, causing a deformation 7 in the shaft. Such dishing is the most common failure mode of any rectangular section retaining ring. Groove deformation, such as that illustrated in FIG. 2, can occur in instances where the shaft or bore is formed of materials such as aluminum, cold rolled steel, low carbon or mild steel or other softer materials. In situations like this, design engineers will often specify custom rings made specifically for deeper grooves or rings with an increased thickness to fit into wider grooves, thereby providing increased thrust capacity. Such rings are much harder to remove from the groove and are often damaged when removing or reinstalling Many ring manufacturers offer a choice of retaining rings for different thrust capacities. In the situation of a light duty application, the groove depth would be shallower than for other rings designed to handle higher thrust capacities. Groove standards were established many years ago by U.S. military and aircraft specifications. Many retaining ring manufacturers adopted these specifications for imperial ring manufacturing. DIN Standards for retaining ring grooves were also established years ago in Europe as European engineering standards, and many OEMs have adopted these metric specifications as standard. In either standard, the retaining rings and grooves are designed to handle heavy thrust loads. This being the case, the majority of retaining rings specified worldwide are designed using the established world standards for heavy thrust capacity applications.

Components being retained on a shaft, or within a bore, generally have a radial width that is greater than the radial section of the retaining ring that extends radially beyond the shaft or bore of the groove in which the retaining ring is seated. The surface of the component that contacts the ring is often flat and presses evenly across the entire radial section of the retaining ring. But in some applications, the component that presses against the retaining ring may not have an even surface or may have a radius or chamfer that does not press evenly against the radial section of the ring. Examples of such situations include a component with a chamfered or radiused edge, and one that is not concentric to the shaft or bore such that there is a clearance between the two components.

Figure 3:
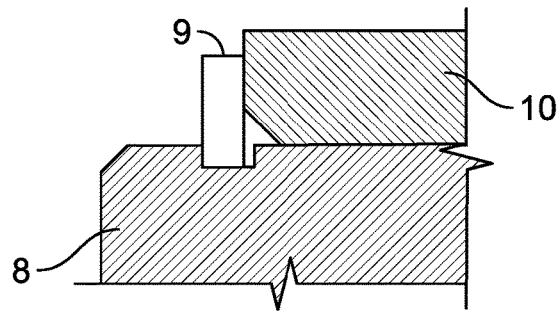
FIG. 3 shows a prior art ring being used with a component that has a chamfered edge.
Figure 4:
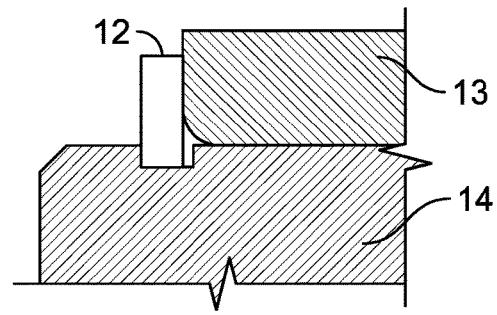
FIG. 4 shows a prior art ring being used with a component that has a radiused edge.
Figure 5:
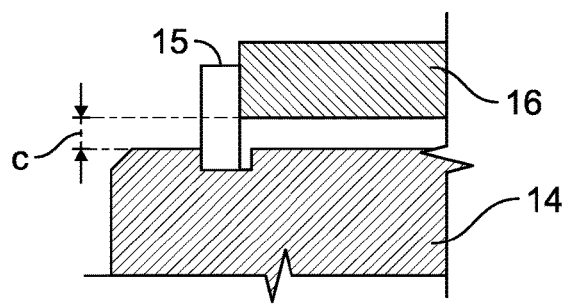
FIGS. 5 and 6 show prior art rings being used with a component in contact with the rings.
Figure 6:
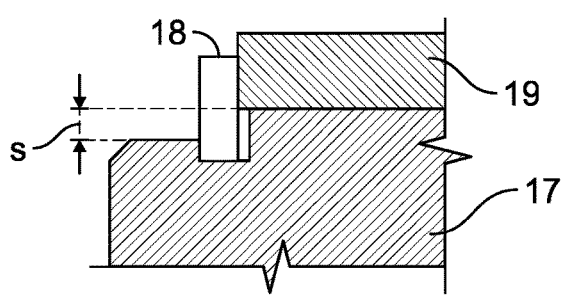

As illustrated in FIG. 3, for example, a retaining ring 9 is positioned in a groove on a shaft 8, and a component 10 having a chamfered edge is in contact with the retaining ring 9. In FIG. 4, a retaining ring 12 is in a groove on a shaft 11, and a component 13 having a radiused edge is in contact with the retaining ring 12. In FIG. 5, a retaining ring 15 is in a groove on a shaft 14, with component 16 in contact with the retaining ring. There is a clearance C between the component 16 and the shaft 14. FIG. 6 illustrates a retaining ring 18 in a groove on a shaft 17 and a component 19 in contact with the retaining ring 18. The sides of the groove in the shaft 17 are uneven, resulting in a step of an amount S between one side of the groove and the other. In each of the situations illustrated in FIGS. 3-6, a moment arm can result, possibly causing the ring (e.g., ring 1, 6, 9, 12, 15, and/or 18) to dish and eventual ring failure. In this condition, the ends of the ring will also move, further contributing to the problem. Generally, the objective of a mechanical design is to avoid such conditions.

Figure 7:
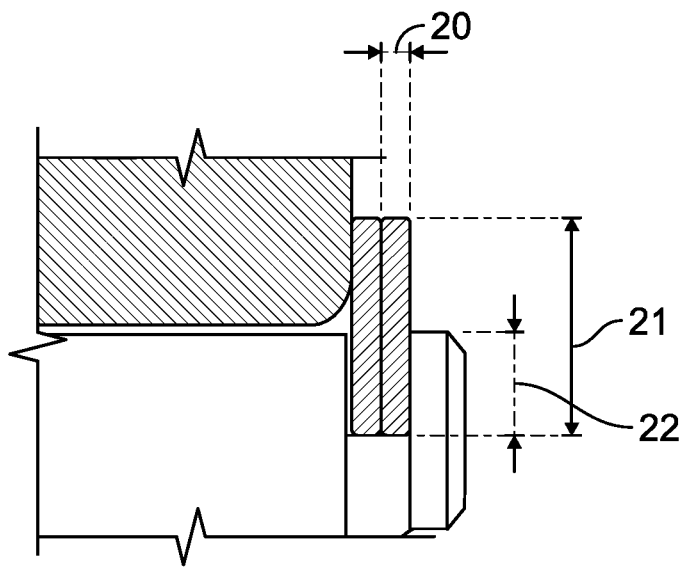
FIG. 7 is a diagram of a prior art ring installed in the groove of a shaft.
Figure 8:
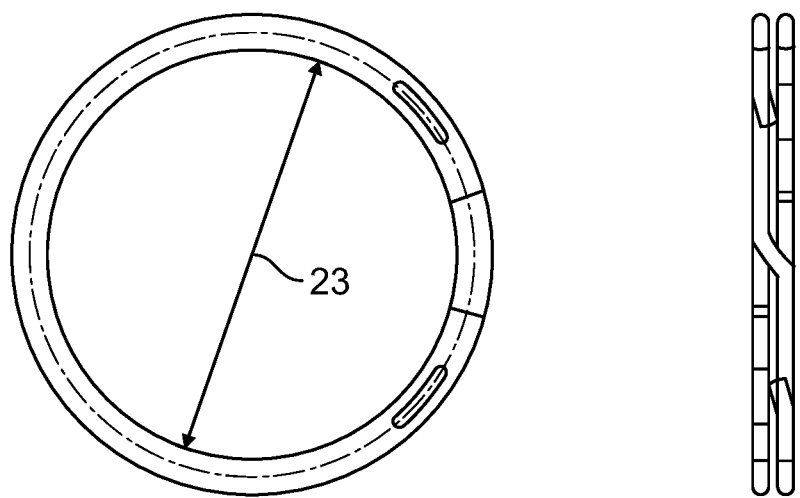
FIG. 8 shows an example centerline (CL) type self-locking ring.
Figure 9:
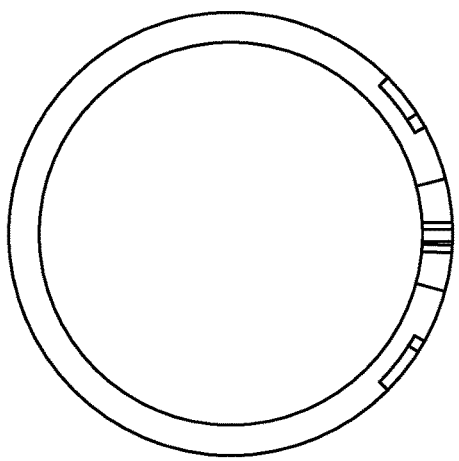
FIG. 9 shows an example outside diameter (OD) type self-locking ring.
Figure 9:

For external retaining rings operating in a groove cut into a shaft, rotational speed can be an additional factor that can lead to failure of the ring. FIG. 7 is a diagram of a ring installed in the groove of a shaft. Factors such as the material thickness 20, radial wall 21, diameter 23, cling (the amount of interference fit to the groove, not shown), and groove depth 22 can all impact the rotational speed at which the ring will expand out of the groove and eventually fail. To extend the rotational capacity of a spiral retaining ring, a locking feature can be added to increase the rotational speed. There have been a few types of locking features introduced into the marketplace. One of these is a self-locking feature that incorporates a tab that interlocks with a slot. Two examples of such self-locking features are shown in FIGS. 8 and 9. In particular, FIG. 8 shows an example of a centerline (CL) type self-locking ring and FIG. 9 shows an example of an outside diameter (OD) type self-locking ring.

Figure 10:
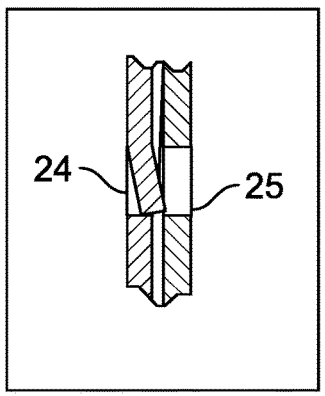
FIG. 10 shows the tab of a prior art ring engaging with a slot wall.

FIG. 10 shows the tab of a prior art ring engaging with a slot wall, which are problems experienced by the rings of FIGS. 9 and 10. As the ring rotates and approaches the rotational speed at which the ring begins to expand from the groove due to centrifugal force, the tab 24 engages the slot wall 25. This engagement prevents the ring from opening any further and also retains the ends of the ring to prevent them from moving. The retention of the ends of the ring, in addition to preventing expansion, provides a significant increase in the rotational capacity of the ring. However, this engagement does not prevent the expansion of the ring indefinitely. Based on the parameters of the ring, the ring will still reach a rotational speed at which the self-locking feature will no longer prevent expansion. At this point, the ring expands out of the groove completely, leading to the failure of the ring.

Figure 11:
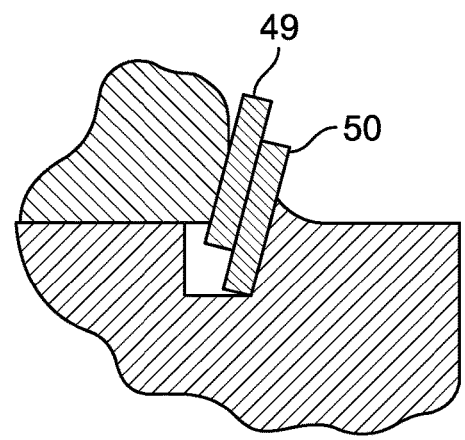
FIG. 11 shows a prior art ring working its way out of a groove.
Figure 12:
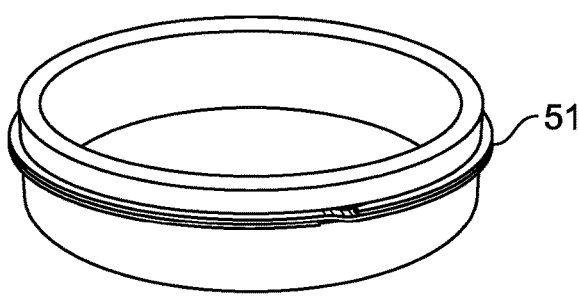
FIG. 12 shows an external ring with a self-locking feature.
Figure 13:
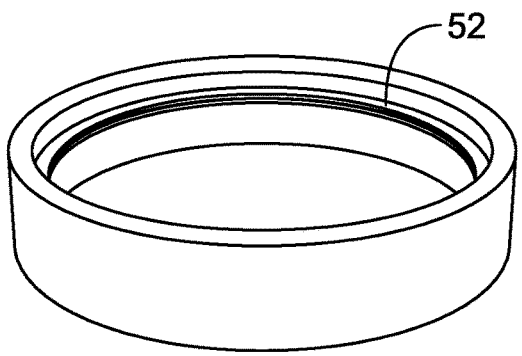
FIG. 13 shows an internal ring with a self-locking feature.

The same concept that extends the rotational capacity of the spiral retaining ring can also be used to help prevent the ends of the retaining ring from working their way out of the groove as a result of excessive vibrational or impact loading as described above. For example, vibrational and impact loading can cause the ring to dish out of the groove. FIG. 11 shows an example of a ring working its way out of a groove. When the ring starts to dish, turn 49 slides over turn 50 and eventually works its way out of the groove. By locking the ends in place with the self-locking feature, it becomes harder for the ring turns (turns 49 and 50) to slide and dish out of the groove. In these cases, the self-locking feature can be used for either the external self-locking ring 51 of FIG. 12 or the internal self-locking ring 52 of FIG. 13.

However, there are a number of limitations that exist with current self-locking retaining ring designs as described herein. As one example, self-locking rings with locking tabs can be difficult to install when using an automated or semi-automated method for installation. In particular, FIG. 14 shows an automated installation process for an external self-locking ring and FIG. 15 shows an automated installation process for an internal self-locking ring.

Figure 14:
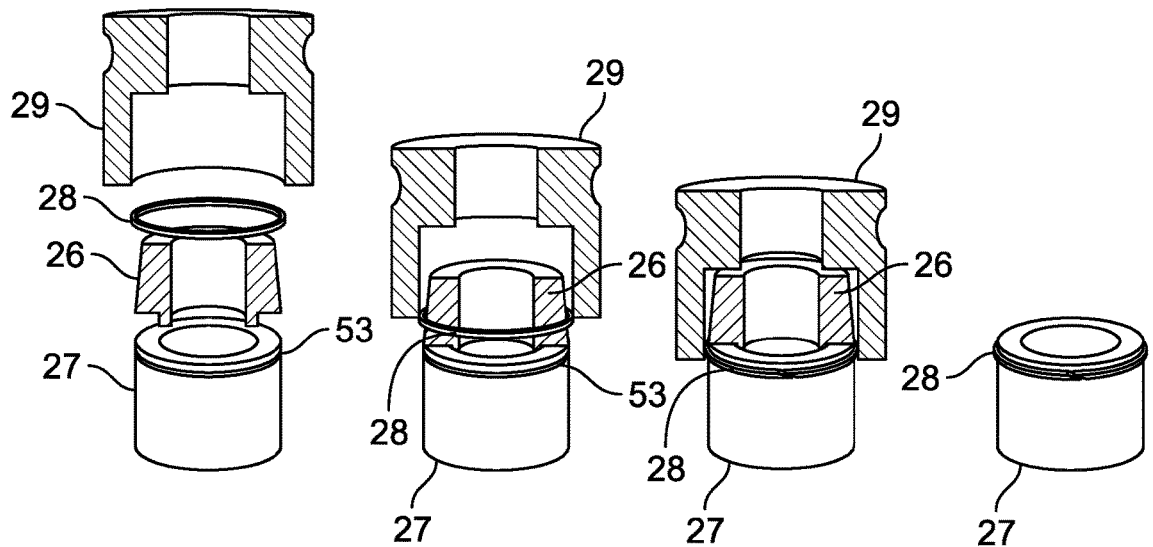
FIG. 14 shows an automated installation process for an external self-locking ring.

When installing an external type ring 28, it is expanded over a tapered plug 26 to assemble into the groove 53 cut in a shaft 27 as shown in FIG. 14. This is done by taking a hardened plug 26 with a tapered outside diameter and lining it up with the shaft 27 that has the groove 53 in which the ring 28 will be installed. The ring 28 is aligned on the tapered plug 26 and pressed with a plunger 29 along the axis of the plug 26 leading onto the shaft 27. The taper on the plug 26 facilitates installation by gradually increasing the diameter of the ring 28 up to the diameter of the shaft 27. Once the ring 28 is located on the shaft 27, it will be pressed until it completely engages in the groove 53. With a tabbed self-locking ring (see FIGS. 19-20), the tabs can prematurely engage in the corresponding slots on the ring 28, thus preventing further expansion and also preventing installation onto the shaft before it engages in the groove. In this condition, if too much force is applied, the tab could yield and no longer engage the slot properly or the tab can shear off. In either case it renders the self-locking feature non-functional.

Figure 15:
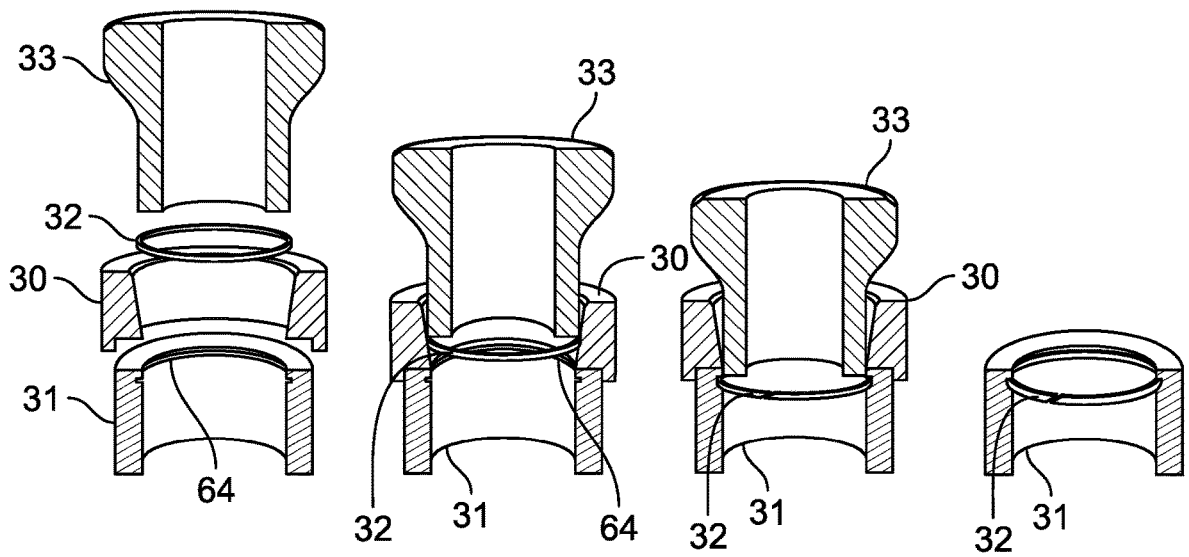
FIG. 15 shows an automated installation process for an internal self-locking ring.

The same is true for an internal self-locking ring (e.g., ring 32 of FIG. 15). The internal ring 32 is compressed into a tapered sleeve 30 that leads the ring 32 into the groove 64 cut into a bore 31. This is done by lining up a hardened sleeve 30 with a tapered inside diameter with the bore 31 that has the groove 64 in which the ring 32 will be installed. The ring 32 is aligned in the tapered sleeve 30 and pressed with a plunger 33 along the axis of the sleeve 30 leading into the bore 31. The taper in the sleeve 30 facilitates installation by gradually decreasing the diameter of the ring 32 down to the diameter of the bore 31. Once the ring 32 is located in the bore 31, it will be pressed until it completely engages in the groove 64. Premature engagement of the slot and tab can also occur in this case leading to the same potential failure mode as with the external self-locking retaining ring.

Retaining rings are generally used by positioning them in a groove that is located on a shaft or within a bore. In various applications, retaining rings can be utilized to retain a component adjacent to a shaft or bore thus forming an assembly. Such assemblies can include a groove for receiving a retaining ring, the groove being located on a shaft or in a bore, a retaining ring, and a component in contact with the retaining ring that is retained adjacent to the shaft or bore by the retaining ring.

Figure 16:
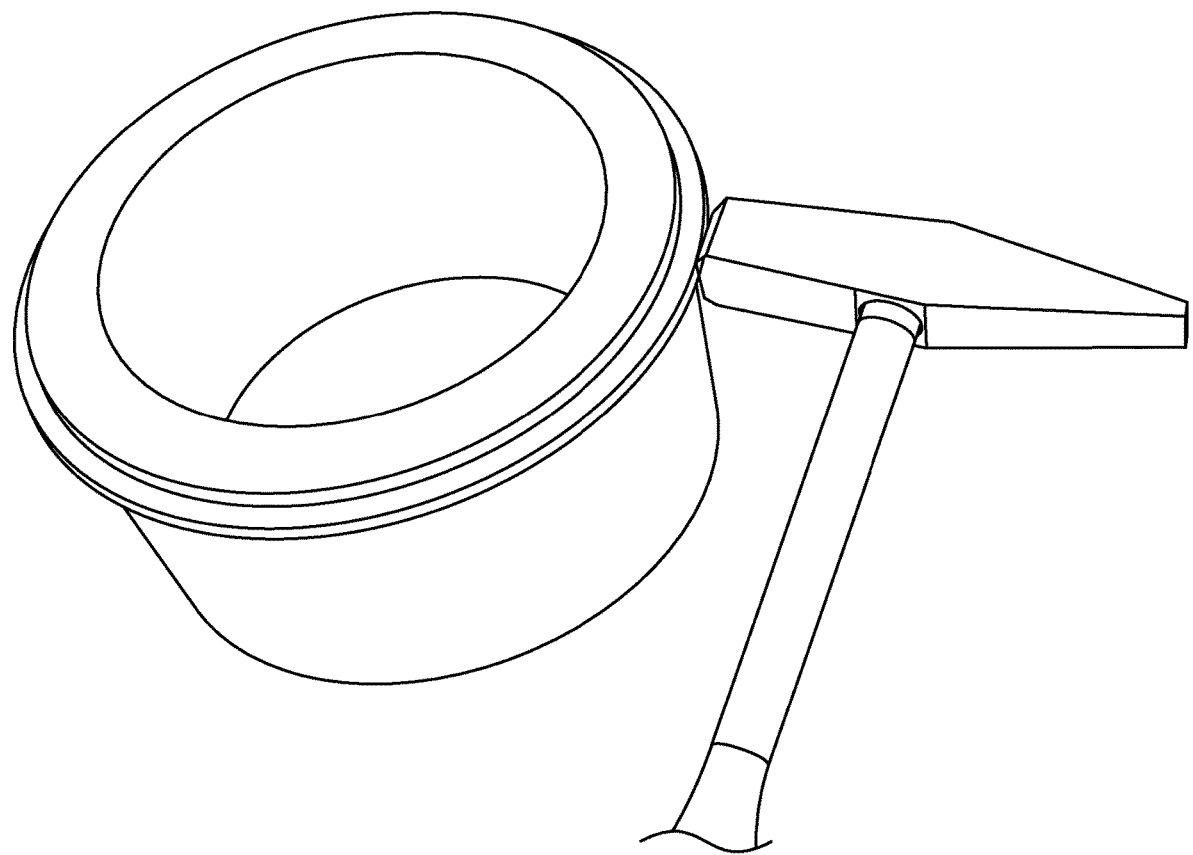
FIG. 16 shows an installation step for a tabbed self-locking ring.

In some embodiments, as shown in FIG. 16, the installation of a tabbed self-locking ring generally involves a slight strike on the last end of the ring with a small hammer to complete the tab and slot engagement in the groove. This often occurs with the manual installation of rings, as shown in FIGS. 17 and 18. In particular, FIG. 17 shows a manual installation process for an external ring and FIG. 18 shows a manual installation process for an internal ring.

When installing an external ring by hand onto a shaft, it is installed by spreading apart the revolutions of the ring and winding them onto the shaft (see FIG. 17). The end of the retaining ring that reaches the groove first should be positioned to engage in that groove in the shaft so that when the rest of the revolutions of the ring are wound to the location of the groove, they are able to be pressed into the groove fully and snap in place, thus completing the installation. The same method is performed for an internal ring that is installed into a bore, with the exception that the ring is wound and compressed into the groove within the bore (see FIG. 18).

Figure 19:
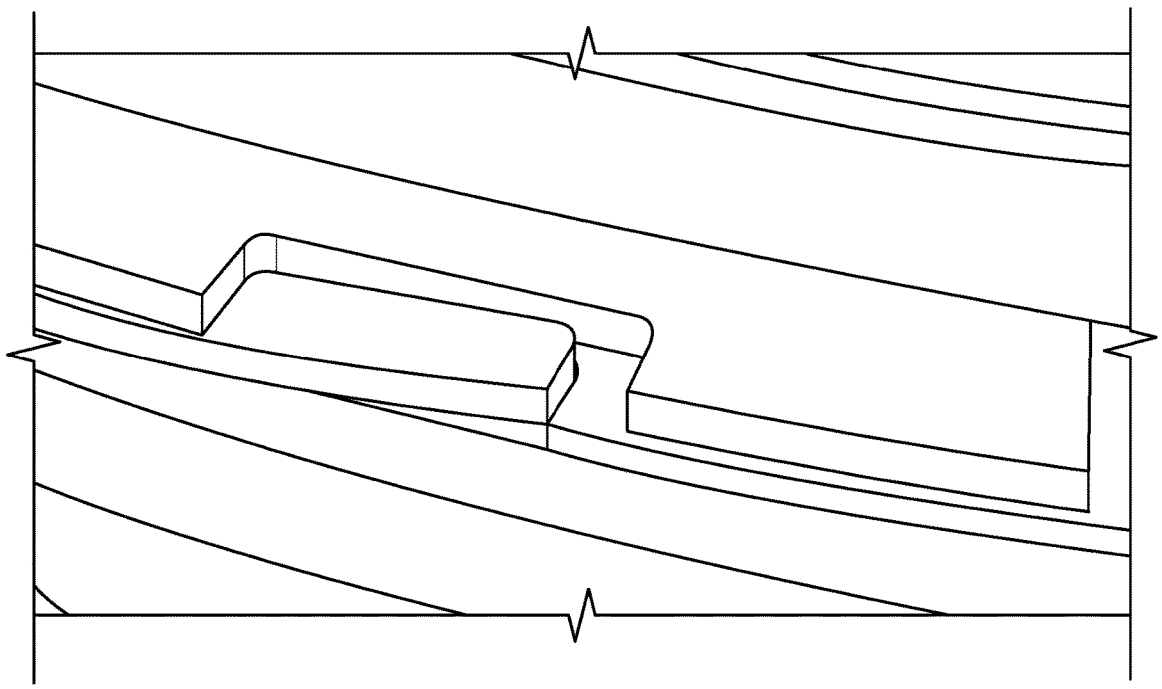
FIGS. 19-21 show a tabbed self-locking ring of the prior art.
Figure 20:
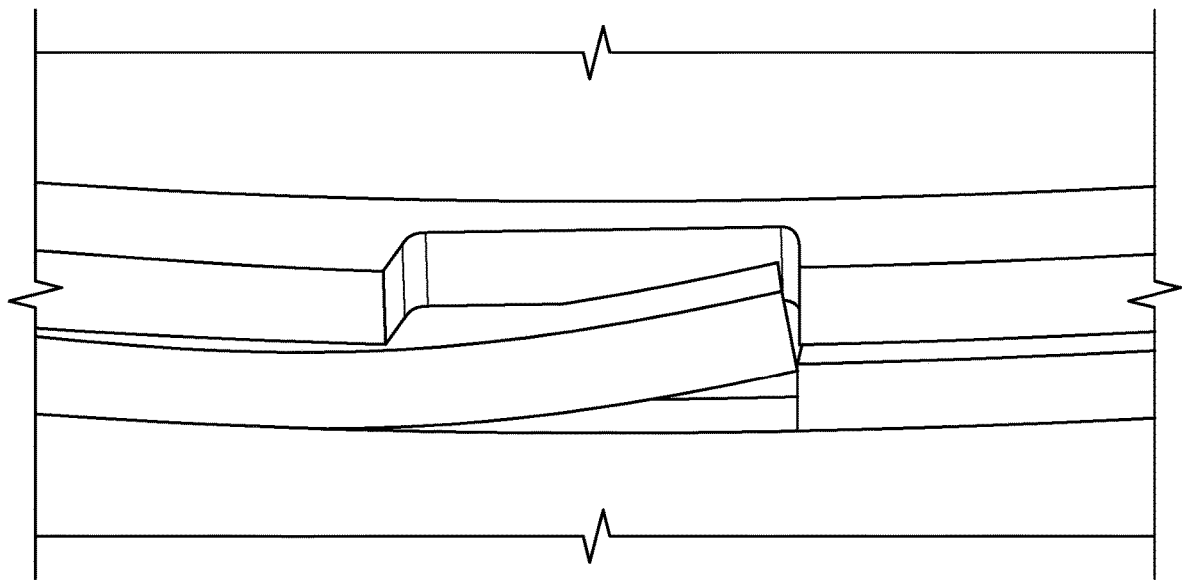
Figure 21:
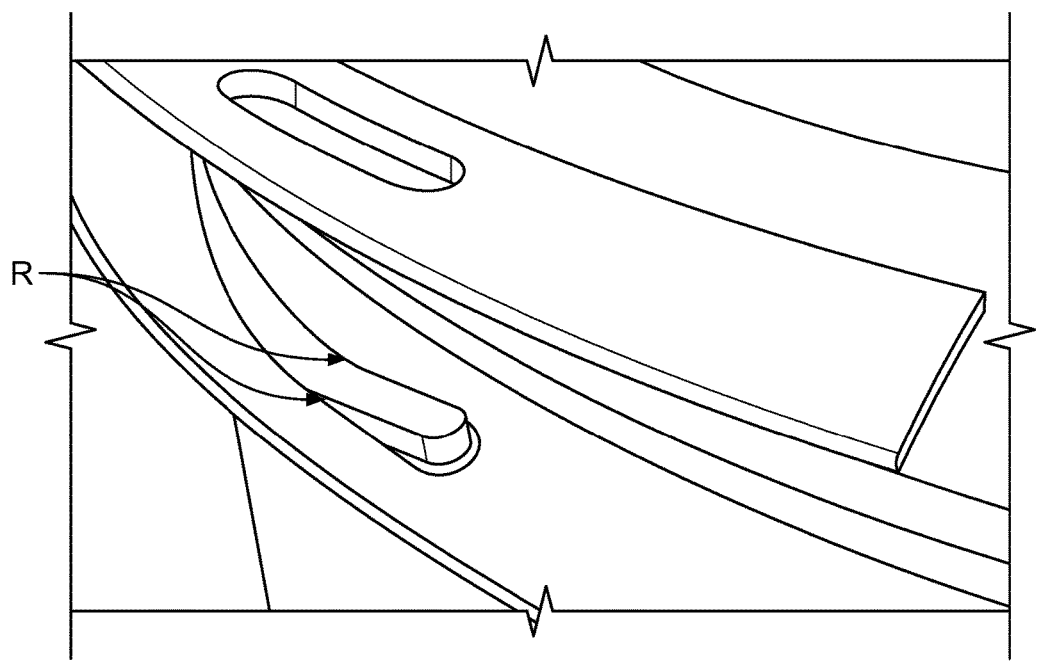
Figure 22:
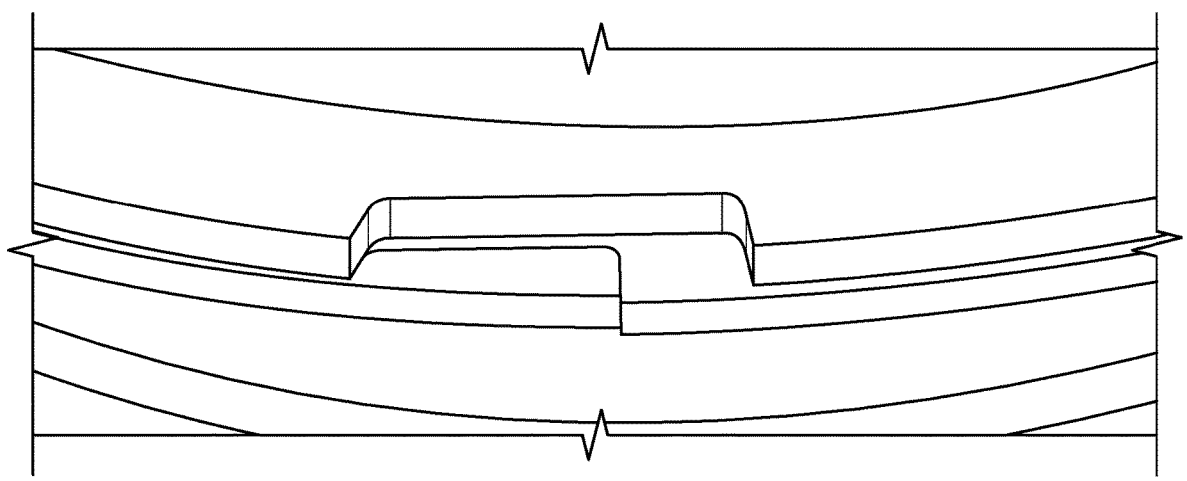
FIG. 22 shows a deficiency in tabbed self-locking rings.

FIGS. 19-21 show a tabbed self-locking ring of the prior art. The tabs (e.g., the raised portion) of each ring experience the various difficulties described herein. In addition, the tab of FIGS. 19-21 is typically produced using a punch that cuts into the material and bends up the tab. The end of that cut acts as a stress riser R (FIG. 21) can be a contributor to the failure of the tab. If the tab is deformed or bent during installation so that it is no longer protruding from the plane of the ring material, as shown in FIG. 22, the tab may no longer be effective.

Accordingly, embodiments of the present disclosure relate to a self-locking retaining ring with a dimple locking mechanism. The disclosed rings utilize a dimple or dome, rather than a tab, and such a dome/dimple offers various advantages over tabs. For example, deformation is less likely to occur with the disclosed dimple mechanism. For example, the disclosed dimple mechanism is more durable than the tab. There are no significant stress risers that could contribute to premature failure as with the tab. The disclosed dimple mechanism is not created by cutting or piercing the material, so it does not induce the stress risers seen in the tab. Additionally, the disclosed dimple mechanism does not easily deform and become ineffective like the tab can during installation.

A typical use for the embodiments described herein in a rotational capacity would be any case where there is a rotating shaft and a retaining ring is being used to capture another object residing on that shaft. If the rotational capacity of the retaining ring (in a standard or custom configuration) is exceeded, a dimple self-locking feature can be implemented on the ring to increase the performance and meet the rotational demand. This feature could be implemented to reduce machining, assembly time, and/or cost of a more complicated method of retention on the rotating shaft. An example of this would be retention of a component in a high-speed spindle application.

Another typical use for the disclosed principles in an impact or vibrational loading condition would be to replace a machined shoulder or a retaining ring that has been brazed or welded in place on a shaft or in a bore to prevent dishing of that ring under the impact or vibrational loading. This could be implemented to reduce machining, assembly time, and/or cost of a more complicated method of retention in that application.

The dome/dimple described herein is designed to retain the ends of the ring when engaged in a slot on the opposite turn of the retaining ring. Since the dome does not deform as a tab would, it makes removal more difficult. The dimple self-locking ring can be used as a tamper resistant feature to discourage removal of the ring in either an external or internal type application.

Dimple self-locking rings can be produced from materials that are frequently used in the retaining ring industry. This would include various metals that are appropriate for retaining ring use. However, with evolving current and future technologies, this type of ring could be produced in other materials. Some material examples include, but are not limited to, plastics, composites, or other non-metallic materials.

The dome feature in this type of self-locking ring offers some potential manufacturing efficiency improvements. The dimple self-locking feature and configuration can offer longer punch life since it does not cut through the material like with the tabbed self-locking feature.

Figure 23:
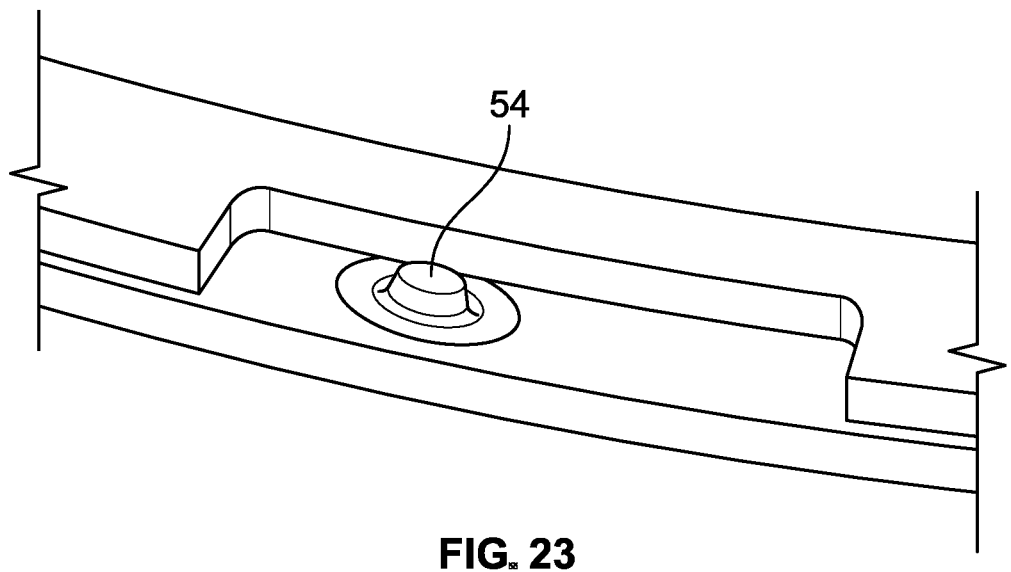
FIG. 23 shows a self-locking retaining ring with a dimple locking mechanism, according to some embodiments of the present disclosure.

FIG. 23 shows a self-locking retaining ring with a dimple locking mechanism 54, according to some embodiments of the present disclosure. The disclosed self-locking rings utilize a dimple 54 (also referred to herein as a dome) rather than a raised tab. The purpose of the dimple self-locking feature 54 is to provide a physical interference to restrict the expansion or contraction of the ring. However, the disclosed dimple mechanism 54 also provides other benefits including, but not limited to, the convenience of potentially not yielding or breaking off during installation, reduced tool wear, faster production speeds, and easier installation. The dimple self-locking feature contributes to increasing the rotational capacity of the retaining ring for an external or shaft application. For both shaft and bore applications, the dimple self-locking feature 54 can be used to prevent movement of the ring ends and prevent expansion or contraction, thus resisting the tendency of the ring to dish out of the groove when exposed to repeated vibration or impact loading.

Figure 24:
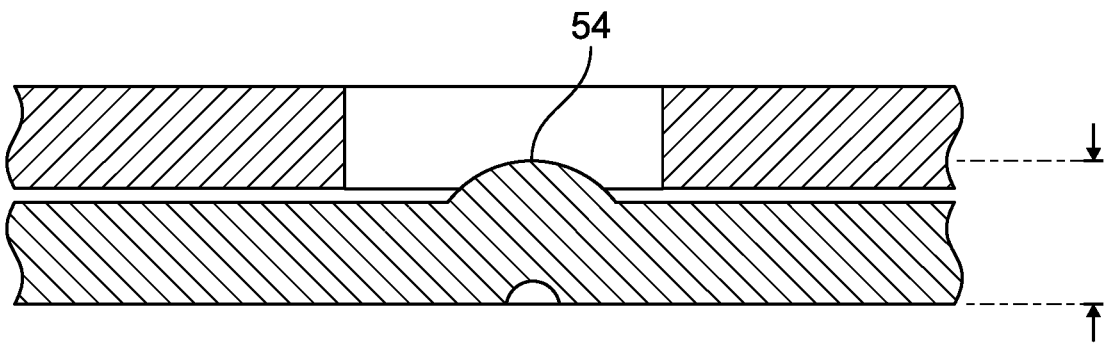
FIG. 24 shows a side view of a dimple locking mechanism, according to some embodiments of the present disclosure.
Figure 25:
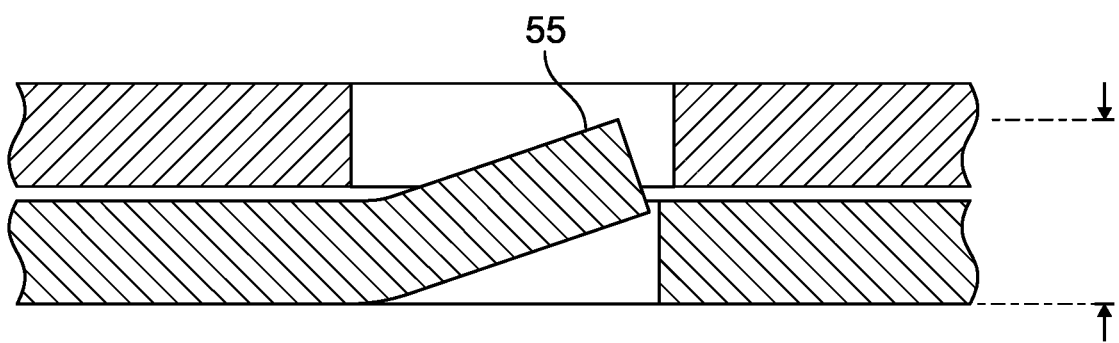
FIG. 25 shows a side view of a tabbed, self-locking ring.

FIG. 24 shows a side view of a dimple locking mechanism 54, according to some embodiments of the present disclosure, while FIG. 25 shows a side view of a tabbed, self-locking ring. The tabbed ring includes a tab 55. In some embodiments, the dimple 54 has the same height as the tab 55.

Figure 26:
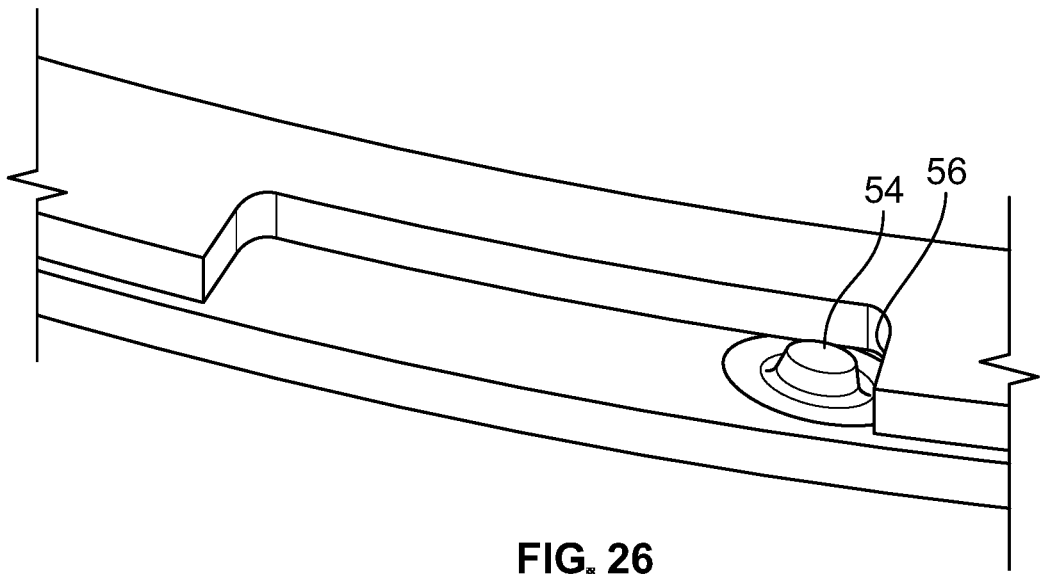
FIG. 26 shows another view of a dimple locking mechanism, according to some embodiments of the present disclosure.

FIG. 26 shows another view of a dimple locking mechanism 54, according to some embodiments of the present disclosure. Whether it is rotation or loading that causes the ring to expand, the dome 54 begins to move toward the end of the slot 56. When the dome 54 engages the slot 56, it binds. This prevents movement of the ring ends and expansion is restricted. The shape of the dome 54 is formed by creating an indentation (also referred to as a dimple) on the opposite side of the ring. This dome can also facilitate installation by not acting as a hard stop as the tabbed feature does (see FIGS. 19-21 and 25). The shape of the dome 54 helps to separate the turns during installation instead of acting as a hard stop as the tab does, thus making installation easier. This combined with the curved profile at the top of the dome 54 facilitates a smoother installation. However, once it is in the installed position, the dome 54 is restricted and captured by the slot 56 and the revolutions (i.e., turns) of the ring material are held together by the tight fit within the groove. Further, by the dome 54 not being able to yield or break off during installation, it eliminates the possibility of a piece of metal becoming loose in the assembly.

The dimple self-locking retaining rings of the present disclosure can be installed either by hand, or in an automated or semi-automated fashion, such as the processes described in FIGS. 14-15 and 17-18. Dimple self-locking rings are less likely to require a strike with a hammer for engagement of the dome and slot (see FIG. 16). The strike is an extra step in assembly of the ring. Removing that strike from the assembly process proves to be beneficial when the ring is installed using an automated or semi-automated method. During installation, the dimple self-locking feature does not engage with the slot in the same manner as the tab does, and it is able to facilitate the slot bypassing the dimple more easily until the two are properly engaged when installed in a groove.

Figure 27:
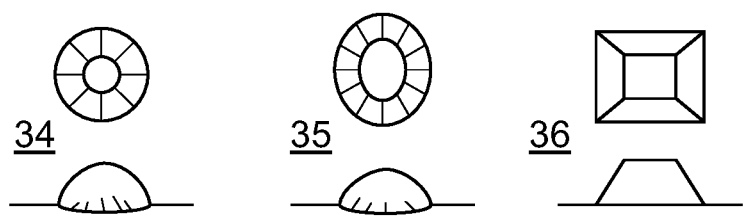
FIGS. 27-31 show additional embodiments of the dimple locking mechanism, according to some embodiments of the present disclosure.
Figure 27:
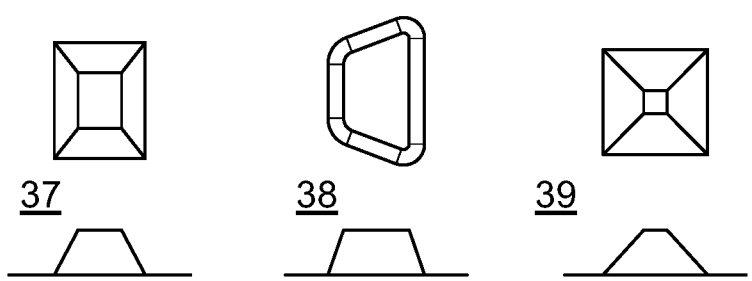

Variations of the dome profile and placement are possible. For example, FIGS. 27-31 show additional embodiments of the dimple locking mechanism, according to some embodiments of the present disclosure. FIG. 27 illustrates a round and dome shaped dimple 34; an oval-shaped dimple 35, a square-shaped dimple 36, a rectangular-shaped dimple 37, a trapezoid-shaped dimple 38, and a triangular-shaped dimple 39, although the disclosed embodiments are not limited to these shapes and a variety of other shapes could work.

Figure 28:
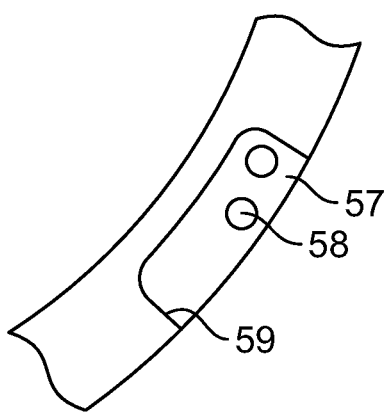

FIG. 28 shows that multiple domes (e.g., domes 57 and 58) can be used with single or multiple slots (e.g., slot 59) to retain the ends of the ring and prevent expansion. In some embodiments, variations on the slot 59 are possible, as well. The slot is merely an opening in the ring to capture the dome and provide a mating surface for the dome to inhibit expansion or compression of the ring.

Figure 29:
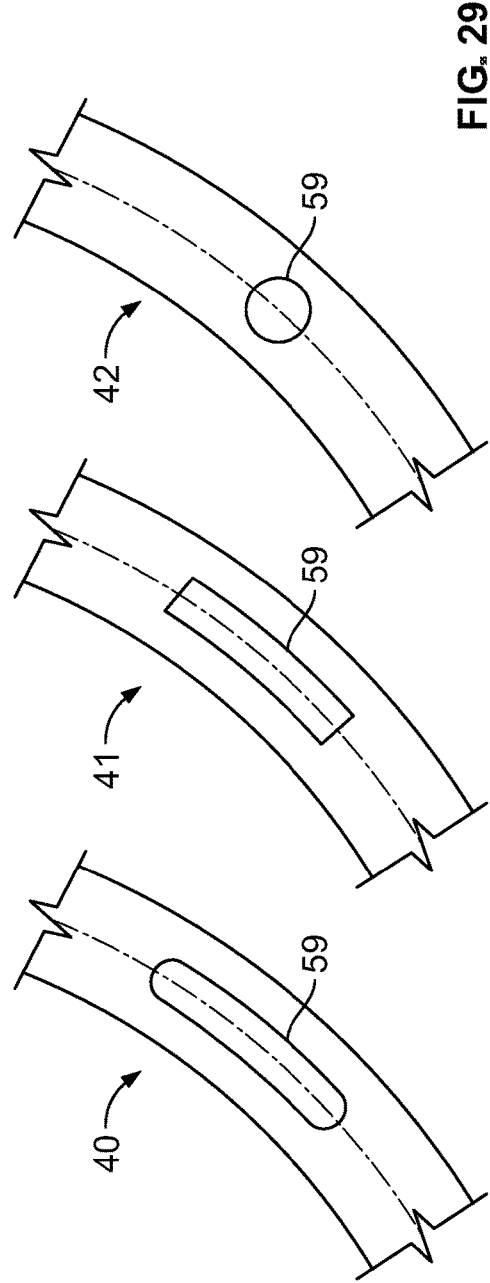
Figure 30:
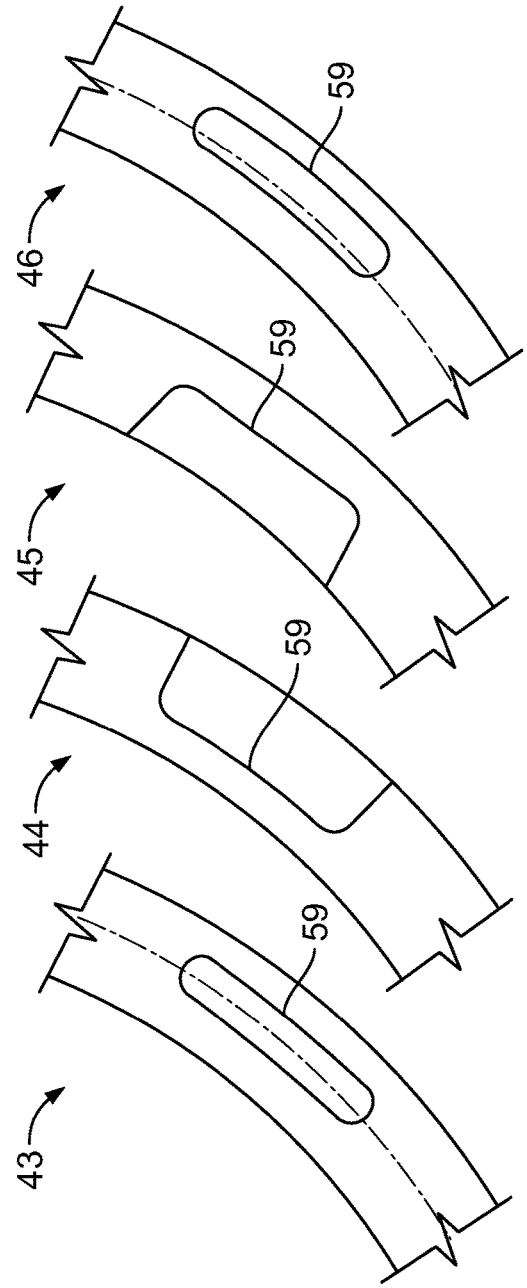
Figure 31:
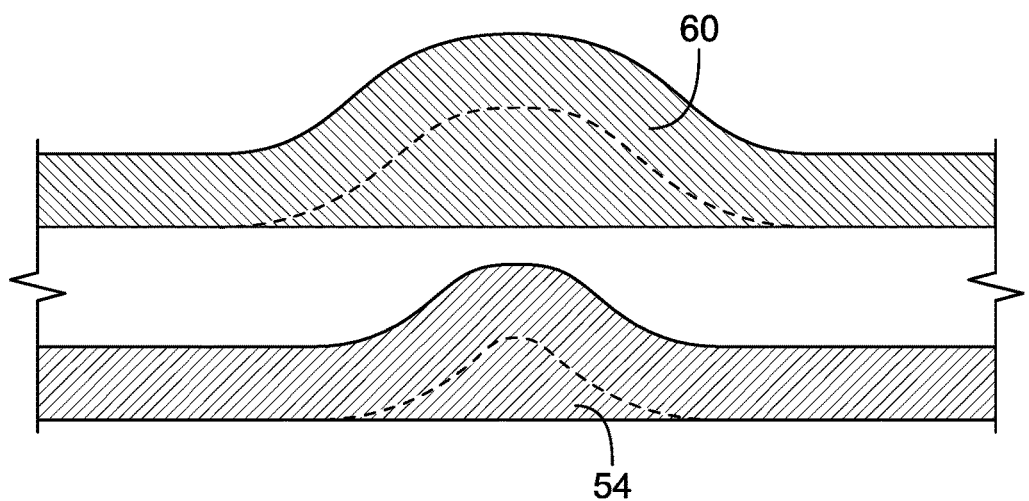

In FIG. 29, the slot 59 can vary in length and width appropriate to design parameters. The slots, for example, can also vary in shape from an oval 40, a rectangle 41, or a circular hole 42, although the disclosed embodiments are not limited to these shapes and a variety of other shapes could work. In FIG. 30, the slot 59 can be positioned along the centerline 43 of the ring material or offset slightly from the centerline 46. It can also be located on the outside of the radial width 44 or inside of the radial width 45 of the radial wall having one side of the slot completely open. Location of the domes 54 and slots 59 are not limited to the ends of the ring material. The domes 54 and slots 59 can reside in different planes and configurations as long as the domes 54 can be captured by the slot 59 and are positioned such that when the ring is expanded the contact between the dome 54 and slot 59 provide an interference, preventing expansion of external rings or compression of internal rings. In place of a slot 59, can be a larger dimple 60, as shown in FIG. 31. As long as the dome that mates with it can fit within that indentation and provide proper engagement.

Figure 32:
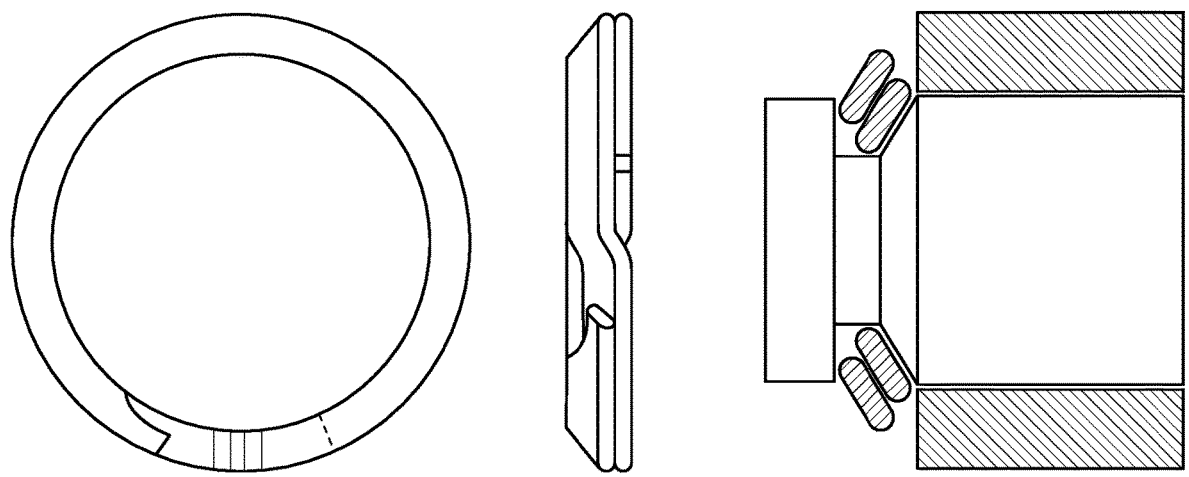
FIG. 32 shows a dished variation of a ring with a dimple locking mechanism, according to some embodiments of the present disclosure.

The dimple self-locking concept can also be used on a dished variation of the retaining ring FIG. 32. This can also be referred to as a dished retaining ring. The flat turns of the wire are parallel to one another even though the ring itself is in a conical shape. This allows the dimple self-locking feature to operate in the same manner as it does with a flat retaining ring.

Figure 33:
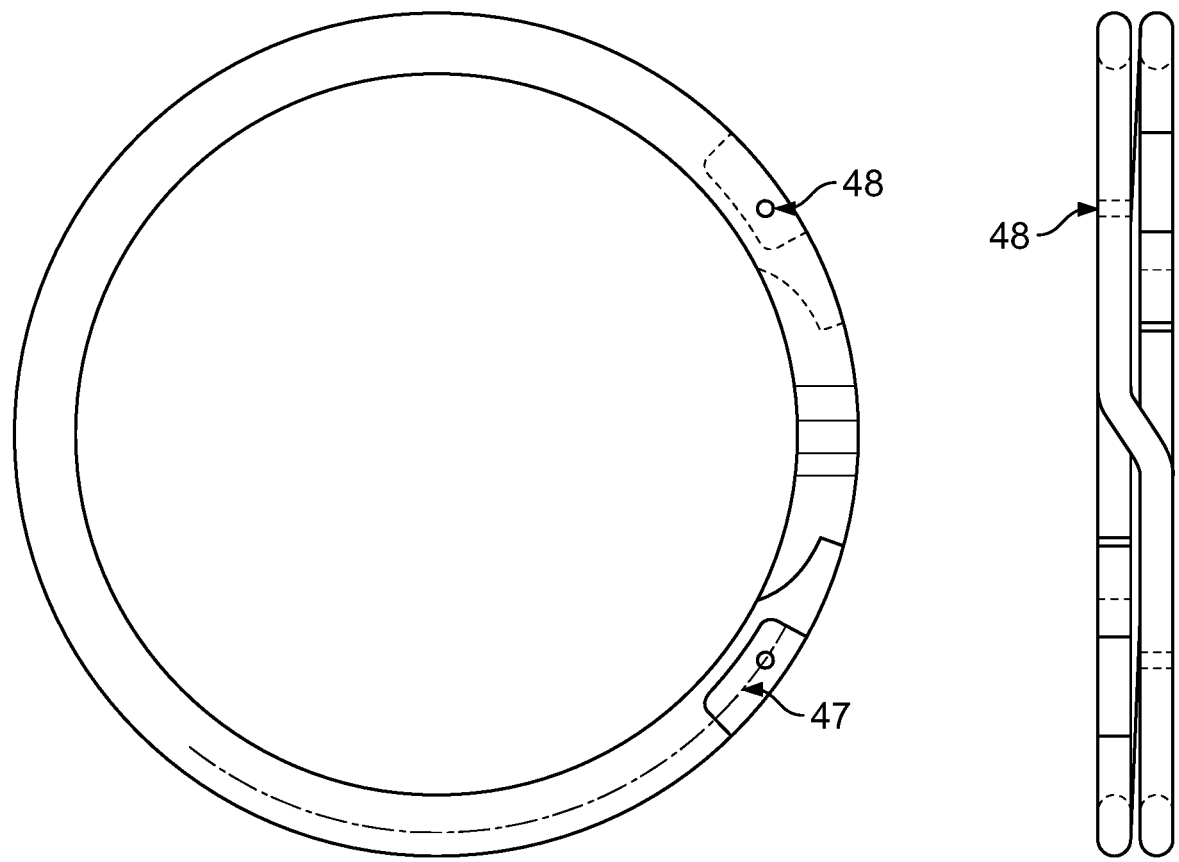
FIG. 33 shows another view of a ring with a dimple locking mechanism, according to some embodiments of the present disclosure.

As seen in FIG. 33, which shows another view of a ring 47 with a dimple locking mechanism, a dimple self-locking ring design is one where a spiral retaining ring is modified to have a slot of some shape and size located typically on each of the ends of the ring 47 (although slots can be located at other positions on the ring as well). Corresponding with each of those slots is a dome, or mound of some shape or form, that resides within the slot 48 and eventually engages the slot, preventing further expansion of the retaining ring. The expansion can be caused by rotational forces, vibrational loading, or impact loading applied to the retaining ring.

From the foregoing it will be appreciated that although specific embodiments of the invention have been described herein for purposes of illustration, various modifications may be made without deviating from the spirit or scope of the invention. It is therefore intended that the foregoing detailed description be regarded as illustrative rather than limiting, and that it be understood that it is the claims, including all equivalents, that are intended to particularly point out and distinctly claim the subject matter regarded as the invention.

The invention claimed is:

1. A self-locking retaining ring comprising:
    a first turn of flat metal comprising a dimple comprising a top with a curved profile; and
    a second turn of the flat metal formed over the first turn, wherein a slot is formed within the second turn and is at least one and a half times the size of the dimple such that the curved profile of the dimple resides at a portion of the slot and moves within the slot, the slot comprising a mating surface for the curved profile, a contact between the slot and the dimple at the mating surface configured to provide physical interference to restrict an expansion or compression of the ring.

2. The self-locking retaining ring of claim 1, wherein the mating surface comprises a slot wall configured to engage the dimple to lock the retaining ring.

3. The self-locking retaining ring of claim 1, wherein the retaining ring is an external ring and is configured to fit outside of a shaft.

4. The self-locking retaining ring of claim 1, wherein the retaining ring is an internal ring and is configured to fit inside of a bore.

5. The self-locking retaining ring of claim 1, wherein the dimple comprises at least one of a circular shape, an ovular shape, a square shape, a rectangular shape, a trapezoidal shape, or a triangular shape.

6. The self-locking retaining ring of claim 1, wherein the dimple comprises the top with the curved profile on a first side of the first turn of the flat metal and an indentation on a second side of the first turn of the flat metal.

7. The self-locking retaining ring of claim 1, wherein the slot comprises at least one of an ovular shape, a rectangular shape, or a circular hole.

8. The self-locking retaining ring of claim 1, wherein the slot is positioned along a centerline of the second turn of the flat metal.

9. The self-locking retaining ring of claim 1, wherein the slot is positioned offset from a centerline of the second turn of the flat metal.

10. A self-locking retaining ring comprising:
    a first turn of flat metal comprising a first dimple comprising a top with a curved profile integrally formed on the flat metal; and
    a second turn of the flat metal formed over the first turn, wherein a second dimple is formed within the second turn and is configured to engage the first dimple to lock the retaining ring.

11. The self-locking retaining ring of claim 10, wherein the retaining ring is an external ring and is configured to fit outside of a shaft.

12. The self-locking retaining ring of claim 10, wherein the retaining ring is an internal ring and is configured to fit inside of a bore.

13. The self-locking retaining ring of claim 10, wherein the first dimple comprises the top with the curved profile on a first side of the first turn of the flat metal and an indentation on a second side of the first turn of the flat metal.

14. The self-locking retaining ring of claim 10, wherein the first dimple comprises at least one of a circular shape, an ovular shape, a square shape, a rectangular shape, a trapezoidal shape, or a triangular shape.

15. The self-locking retaining ring of claim 10, wherein the second dimple is positioned along a centerline of the second turn of the flat metal.

16. The self-locking retaining ring of claim 10, wherein the second dimple is positioned offset from a centerline of the second turn of the flat metal.

\* \* \* \* \*